(12) United States Patent
Jung (10) Patent No.: US 8,856,769 B2
(45) Date of Patent: Oct. 7, 2014

(54) ADAPTIVE INSTRUCTION PREFETCHING AND FETCHING MEMORY SYSTEM APPARATUS AND METHOD FOR MICROPROCESSOR SYSTEM

(71) Applicant: Yong-Kyu Jung, College Station, TX (US)

(72) Inventor: Yong-Kyu Jung, College Station, TX (US)

( * ) Notice: Subject to any disclaimer, the term of this patent is extended or adjusted under 35 U.S.C. 154(b) by 36 days.

(21) Appl. No.: 13/658,723

(22) Filed: Oct. 23, 2012

(65) Prior Publication Data
US 2014/0115569 A1    Apr. 24, 2014

(51) Int. Cl.
*G06F 9/44* (2006.01)

(52) U.S. Cl.
USPC .......................................................... 717/160

(58) Field of Classification Search
USPC .......................................................... 717/160
See application file for complete search history.

(56) References Cited

U.S. PATENT DOCUMENTS

| | | | |
|---|---|---|---|
| 5,187,793 A * | 2/1993 | Keith et al. .................... | 712/225 |
| 5,212,794 A * | 5/1993 | Pettis et al. ................... | 717/153 |
| 5,509,130 A * | 4/1996 | Trauben et al. ............... | 712/215 |
| 6,047,368 A | 4/2000 | Arya | |
| 6,167,536 A | 12/2000 | Mann | |
| 7,181,597 B2 | 2/2007 | Miller et al. | |
| 7,269,715 B2 | 9/2007 | Le et al. | |
| 8,245,208 B2 * | 8/2012 | Eichenberger et al. ........ | 717/150 |
| 8,527,969 B2 * | 9/2013 | Meyers et al. ................. | 717/139 |
| 2001/0049818 A1 * | 12/2001 | Banerjia et al. .................... | 717/9 |
| 2004/0059897 A1 * | 3/2004 | Rose et al. ..................... | 712/233 |

OTHER PUBLICATIONS

Yong-Kyu, Jung, "An emerging adaptive architecture and compilation techniques", Adaptive Hardware and Systems (AHS), 2010 NASA/ESA Conference on, Issue Date: Jun. 15-18, 2010.*

* cited by examiner

*Primary Examiner* — Philip Wang (57) ABSTRACT

A method and system of the instruction packing and scaling are designed for simultaneously enhancing energy efficiency by concurrent and advanced prefetching/fetching instructions via the small and/or banked caches and for improving the performance of microprocessors by reducing the fraction of program and by employing the simple and fast caches. The invention is also designed for converting high fraction code to simplified, branch-reduced, and hidden code during compilation time, for storing packed/scaled code to concurrently accessible the plurality of caches and main memories, and for reverting the code to the native instructions during the instruction prefetch and fetch operations. Consequently, the invention does not forward many flow control instructions including procedure callers/returns and unconditional branches to microprocessors. In particular, the invention accurately prefetches/fetches instructions from the main memories to small, simple, and fast caches, which significantly reduce leakage and dynamic power dissipation, access time, and chip area.

11 Claims, 3 Drawing Sheets

ADAPTIVE INSTRUCTION PREFETCHING AND FETCHING MEMORY SYSTEM APPARATUS AND METHOD FOR MICROPROCESSOR SYSTEM

TECHNICAL FILED OF THE DISCLOSURE

The invention relates to converting native instructions in a program to packed normative and non-packed native instructions (PANIs) and the native instructions of the associative packed normative instructions (NIPIs) at software compilation time and to reverting the PANIs to purely native instructions in the associative NIPIs at runtime according to a single or a plurality of prefetch and/or fetch operations for achieving simultaneous energy reduction and performance enhancement.

The invention also relates to the conservation of instruction cache memory size and operating energy by discarding a plurality of the flow control instructions including subroutine callers/returns from the fetch operations of microprocessors while accurately prefetching and fetching the only native instructions directly from PANIs and/or indirectly from the associative NIPIs in advance. In particular, the invention relates to accessing native instructions from the consecutive and/or the branch target locations if a native branch instruction is identified by the Adaptive Code Fraction Reduction system. Furthermore, the invention relates to the reduction of the instruction cache miss and the flow control instruction (i.e., branch miss prediction) penalties for improving the computing performance of the software program (i.e., assembly and/or machine language program) executed by microprocessors.

The invention relates to the conversion of the software program in prior arts to the branch reduced or eliminated, shortened, and compatible program that allows the microprocessors to keep fetching and executing the native instructions with significantly reduced code fraction. In particular, the invention relates to the usage of the non-packed native and/or scaled packed normative instructions, including branch-hidden loop, non-duplicated inline expanded subroutine, and/or other packed normative instructions in various continuously changing software programs after manufacturing microprocessor systems.

The invention relates to distinguishing packed normative instructions in PANIs for accessing the associated native instructions in NIPIs from the main memories via the instruction cache memories during the instruction prefetch- and fetch-time. More specifically, the invention relates to providing the same or similar effect of concurrent instruction prefetching of a single or a plurality of native instructions on the program flow by accessing dedicated, separate regions of distinct addresses in a hierarchical memory system unlike simply prefetching as many instructions as possible without evaluating the usage of the prefetched instructions as done in prior arts.

BACKGROUND OF THE DISCOLOSURE

The present invention relates generally to a native instruction conversion method and reversion apparatus including an adaptive memory system, and more specifically, it relates to an Adaptive Code Fraction Reduction Method and System Apparatus for Microprocessor System to reduce code fraction, to scale code for packing native instructions at software compilation time, and to adaptively, concurrently prefetch both the mixed PANIs and NIPIs as well as fetch purely native instructions at runtime.

In order to reduce code fraction, the Adaptive Code Fraction Reduction Method generally packs segments of native instructions between two instructions that cause fraction of code including branch and branch target instructions, the so-called basic blocks as done in prior arts. In addition, the invention permits packing already packed instructions, such as PANIs, with NIPIs and/or other PANIs after evaluating the packable and non-packable instructions. The Adaptive Code Fraction Reduction Method packs high fraction code by removing and/or hiding flow control instructions from the code and converts simplified reduced fraction code, which provides a fewer code fractions and a greater number of the native instructions between fractions than the input high fraction code found in prior arts.

The Adaptive Code Fraction Reduction Method provides a means for accurate advanced instruction prefetch and fetch by obtaining information earlier on how many instructions from which locations than the prior arts. The Adaptive Code Fraction Reduction Method generally generates two different types of code—PANI and NIPI from the software compiled program, such as the assembly program, after another round of compilation. The PANIs represent flow of instructions in simplified form. The NIPIs provide flow of native instructions of each packed instructions found in PANIs. The PANIs contain associative opcodes and/or other information, such as start and/or end locations of the native instruction segments of the packed normative instructions, the number of instructions packed in each packed normative instruction, and so on, for the Adaptive Code Fraction Reduction System Apparatus to distinguish different instructions from PANIs as well as to access the number of native instructions from the associative NIPIs.

The invented Adaptive Code Fraction Reduction System Apparatus adaptively fetches and/or prefetches a single or a plurality of PANIs concurrently while delivering a single or a plurality of the associative NIPIs fetched to a single or a plurality of microprocessors in its programming order. The Adaptive Code Fraction Reduction System Apparatus distinguishes the prefetched and fetched packed normative and non-packed native instructions from PANIs stored in the main instruction memory via a single or a plurality of levels of instruction cache memories before delivering the purely native instructions to a single or a plurality of microprocessors. The Adaptive Code Fraction Reduction System Apparatus also prefetches a single or a plurality of the next prospective PANIs while delivering the associative NIPIs and/or non-packed native instructions in PANIs to a single or a plurality of microprocessors.

The Adaptive Code Fraction Reduction Method and System Apparatus for Microprocessor System is designed for reducing instruction cache memory area and operating energy, enhancing access time, resolving or lightening the cost of instruction cache miss penalty, and improving the overall performance of the microprocessor system. The Adaptive Code Fraction Reduction Method and System Apparatus for Microprocessor System uses an Adaptive Code Fraction Reduction Method integrated with a concurrently accessible hierarchical memory system consisting of cache and main memories to achieve the same or similar effect of adaptive concurrent instruction fetching and prefetching of a single or a plurality of native instructions.

The Adaptive Code Fraction Reduction Method and System Apparatus for Microprocessor System permits considerably conserving instruction cache memory or simplifying the cache organization from the hierarchical instruction memory system. Additionally, the Adaptive Code Fraction Reduction Method and System Apparatus for Microprocessor System prefetches a single or a plurality of PANIs on the prospective locations in the program flow concurrently for enhancing cache hit rate and prefetches a single or a plurality of the associative NIPIs. Furthermore, the invention prevents the instruction cache memories from wasting energy by accurately prefetching and fetching the native instructions that are highly used once they have been accessed and stored in the instruction cache memories. Since more operations, including branches, subroutine callers, and subroutine returns, are reduced and/or packed into packed normative instructions, which are stored in and accessed from small, simple, and low-power consumed cache memories, such as direct mapped cache memories, the invention is useful for the low-power and performance-aware mobile microprocessor systems. Furthermore, software developers can compose their own compatible and ciphered instructions before runtime and prefetch and fetch purely native instructions concurrently from the main memory via a single or a plurality of levels of cache memories without worrying about code compatibility or modifying microprocessors.

PROBLEMS OF THE ART

Emerging handheld devices, such as smartphones, run the same capabilities of software as computers. Since any code generated must run on hardware, such as a microprocessor, software code fraction is one of the most significant influences on high-performance and energy efficient operations, which is necessary for mobile computing. In general, mobile operating systems including Android require longer code footprint than operating systems used for desktop computing. In addition, embedded code size is growing quickly. In particular, software code inherently has extremely high fraction. For instance, there is a branch in every seven instructions on average [1]. However, most of the branches do not jump far and most of the loops contain fewer than 30 instructions in the popular benchmarks [1]. For instance, 75% of loops are shorter than 16 instructions and more than 90% of loops have fewer than 30 instructions. Only a few loops typically consume most of the execution time of the microprocessor in embedded systems.

U.S. Pat. No. 5,509,130 [2] describes packing and issuing instructions simultaneously per clock cycle for execution. An instruction queue stores sequential instructions of a program and branch target instruction(s) of the program, both of which are fetched from the instruction cache. The instruction control unit decodes the sequential instructions, detects operands cascading from instruction to instruction, and groups instructions according to a number of exclusion rules which reflect the resource characteristics and the processor structure. This approach, however, groups instructions after fetching sequential instructions from the instruction cache. Therefore, it still requires maintaining at least the same size of the instruction cache. It also requires involving branch prediction and resolution hardware units for branch instructions because of packing at runtime. Consequently, the instruction cache, branch prediction, and resolution-related hardware cannot be reduced.

U.S. Pat. No. 6,047,368 [3] claims that an instruction packing apparatus employs a compatibility circuit including translation and grouper circuits where the translation and grouper circuits, respectively, transform old instructions to new instructions as simpler forms and group instructions based on instruction type by hardware when transferring a cache line from the memory to instruction cache. In order to identify a packed normative instruction, the invention [3] deploys identifiers for groups and functionality during translation. Although the dynamical packing and identifying of assigned functionalities of the packed normative instructions issue and execute concurrently, this approach focuses only on increasing instruction level parallelism while paying additional hardware cost. Unlike the Adaptive Instruction Prefetching System apparatus, U.S. Pat. No. 6,047,368 [3] does not physically reduce the bit-length of instructions. Therefore, this approach still requires at least the same or more instruction cache, which causes the same or more energy consumption.

U.S. Pat. No. 7,269,715 [4] presents an improved method and apparatus for packing instructions processed in the same sized instruction sets. This approach distinguishes a current set of instructions received as part of a group including a prior set of instructions using a history data structure. In addition, this approach recognizes a critical path or bottleneck to break apart incoming instructions into special groups or formations during the instruction fetch between a secondary memory and the instruction cache. The packed or reformatted normative instructions with a packing indication are issued to the execution units. This approach requires additional hardware, such as grouper circuit and translation circuit.

On the other hand, a hardware system consisting of microprocessor and memory system has inherent mismatch because of the huge operational speed gap between microprocessor and memory system. In order to compensate for this speed gap, fast cache memory has been utilized in the computer hardware system. Because of high code fraction, instruction cache memory has been increasing continuously. For instance, more than 90% of transistors have been used for cache memories in a commercial microprocessor [5]. A major reason why more instruction cache memory has been employed is its close relation to high code fraction.

Since multiple instructions are typically accessed at the same time, there are many unused instructions that are accessed but never used. These inaccurate instruction prefetch and fetch operations result in the occupation of large portions of instruction cache memory as well as the waste of large amounts of instruction cache memories. Consequently, large amounts of instructions are prefetched and/or fetched and discarded while dissipating a significant amount of energy to access instructions to the cache memory and keeping the instructions in the cache memory. For instance, instruction cache memory consumes about 27% of overall energy consumption in a microprocessor system [6].

Instruction cache fetch becomes much wider and typically involves fetching an entire line. However, because of the high frequency of taken branches in applications, all instructions in an instruction cache block may not actually be used. For example, the instruction fetch unit accounts for 14% of the total power dissipation in Intel's Pentium-Pro processor [7]. In order to mitigate this fraction of taken branches and the fraction of unused instructions, many complex instruction cache architectures (e.g., trace/content-addressable-memory (CAM)/other configurable caches) have been developed.

These specific caches allow saving up to 50% of the instruction cache energy. Especially, CAM tags in highly-associative instruction and data caches show about 48% of instruction cache energy saving, which is equivalent to 19% of overall processor energy reduction, although they consume 5 to 10 times more energy than the same size of SRAM-tag array [8]. This power hungry nature is compensated by the high associativity. This means that higher hit rate with complex caches is more desirable for energy saving than using simple low-powered direct mapped caches. For these reasons, the energy consumption of both the instruction cache and the instruction fetch unit is a major design concern in current and next-generation low-power processors.

Furthermore, more and more features have been added to caches in order to squeeze out additional power saving. A direct mapped cache, which has a simplified structure, has a much lower per access energy consumption (i.e., about 40%) than the same sized set associative cache [9]. In addition, a direct mapped cache has faster access time because it does not have a multiplexer that is employed by a set associative cache. However, the direct mapped cache has poorer hit rates than the same sized set associative one. This results in more memory access, causing both energy and time costs.

A trace cache [10] is presented that contains decoding information of the instructions consecutively executed before. In order to achieve higher throughput from superscalar processors, fetching multiple basic blocks per cycle becomes necessary. In addition, conventional instruction cache memories hinder the multiple-block fetching per cycle because instructions in the blocks are not always in contiguous locations in the cache memories. The trace cache supplements the conventional instruction cache by dynamically tracing the instruction stream and contiguously locating the instructions. The trace cache directly passes the decoding information when the same instruction stream is decoded. Consequently, performance enhancement and high bandwidth instruction fetching can be achieved with the trace cache. However, this approach heavily relies on the capability of employing branch prediction hardware for performance improvement. The trace cache approach must obtain decoding results after dynamically decoding the same instructions. The trace cache approach cannot hold all of the traces of the multiple blocks without increasing the trace cache size. Furthermore, this approach must redecode and keep the trace of the decoded results of the instruction block if the trace of the same block is changed.

U.S. Pat. No. 6,167,536 [11] presents an on-chip instruction trace cache capable of providing information for reconstructing instruction execution flow. In particular, U.S. Pat. No. 6,167,536 [11] presents the instructions that disrupt the instruction flow by branches, subroutines, and data dependencies. Therefore, this approach allows less expensive external capture hardware to be utilized and also alleviates various bandwidth and clock synchronization issues confronting many existing solutions.

U.S. Pat. No. 7,181,597 [12] provides enhanced performance employing a trace cache. In particular, this approach decodes the first instruction into a plurality of operations with a decoder. The decoder passes the first copy of the operations to a build engine associated with a trace cache. In addition, the decoder directly passes the second copy of the operation to a back end allocation module in a decoder. This approach enhances performance by selectively bypassing a trace cache build engine.

Therefore, a mismatch of high code fraction in software and a combination of fast and slow components in hardware still require cost operation in terms of energy and performance.

SUMMARY OF THE DISCLOSURE

The invention generally relates to a code fraction reduction method in software and to a low-power and high-performance microprocessor system consisting of an adaptive instruction memory system and a microprocessor in hardware. In order to reduce code fraction, the invention packs segments of native instructions between two instructions that cause code fraction. Since the conditional branch instructions are the only ones that are considered the instructions that cause code fraction; other types of branch instructions including subroutine callers and returns and unconditional branches are not the cause of any code fraction in the invention.

The invention relates to conversion of the high fraction native instructions into the reduced fraction heterogeneous instructions before runtime and to reversion of the heterogeneous instructions stored in dedicated, separate regions of distinct addresses in a single or a plurality of small, simple, and fast instruction cache and main memories back to reduced fraction native instructions at instruction prefetch and fetch time. In addition, the invention relates to accurate advanced and concurrent prefetch and fetch of a single or a plurality of heterogeneous instructions, such as PANIs and NIPIs.

The invention relates to the composition of the packed normative instructions. Each packed normative instruction or non-packed native instruction has an opcode and an information field containing location information of the first native instruction of the segment of the packed normative instruction. The packed normative instruction can have an additional field for finding the last native instruction of the segment of the packed normative instruction in order to terminate the associated instruction prefetching and/or fetching operations.

The invention is designed for conserving energy consumption in the microprocessor memory system by stopping the instruction prefetch and/or fetch from the memory system to the microprocessor upon fetching a conditional branch instruction and resuming the instruction prefetch and/or fetch upon receiving the next program address of the conditional branch instruction, which triggers to stop prefetching and/or fetching the next instructions, from the microprocessor. This prevents the microprocessor from discarding the significant amounts of the instructions fetched in prior arts.

The invention is also designed for conserving further energy consumption on the instruction cache memories by employing a single or a plurality of small, simple, and fast instruction cache memories, which consume less operational energy than a plurality of large, complex, and slow cache memories used in prior arts while improving performance of the microprocessor.

The invention is designed for improving performance of microprocessors by reducing branch instructions from the code. The invention eliminates subroutine callers and returners for native subroutine caller instructions, which jump to and return from the associated subroutines, if necessary. The invention also packs the branch instruction in a loop so that the packed instruction can hide branch operations in the converted code. In particular, the invention packs a single or a plurality of branch instructions in a single or a plurality of levels of loops.

There has thus been outlined, rather broadly, some of the features of the invention in order that the detailed description thereof may be better understood, and that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Figure 1:
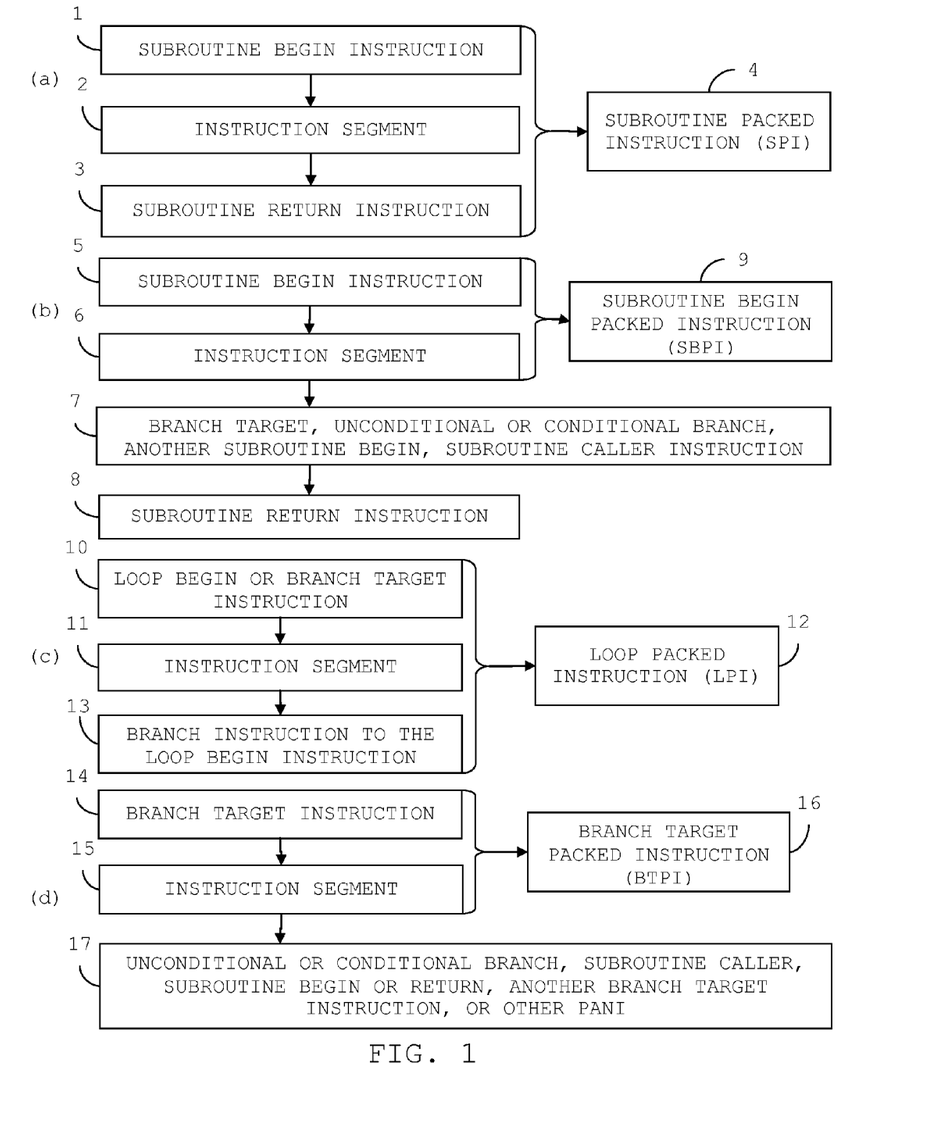
FIGS. 1 and 2 are the diagrams showing one embodiment of an instruction packing and scaling for reducing the fraction of program consisting of a dynamic code reversion system and a static code conversion system with a precise prefetching and fetching termination method and the invented two types of code, such as PINIs consisting of PANIs and non-packed native instructions and NIPIs, generated from the program.
Figure 2:
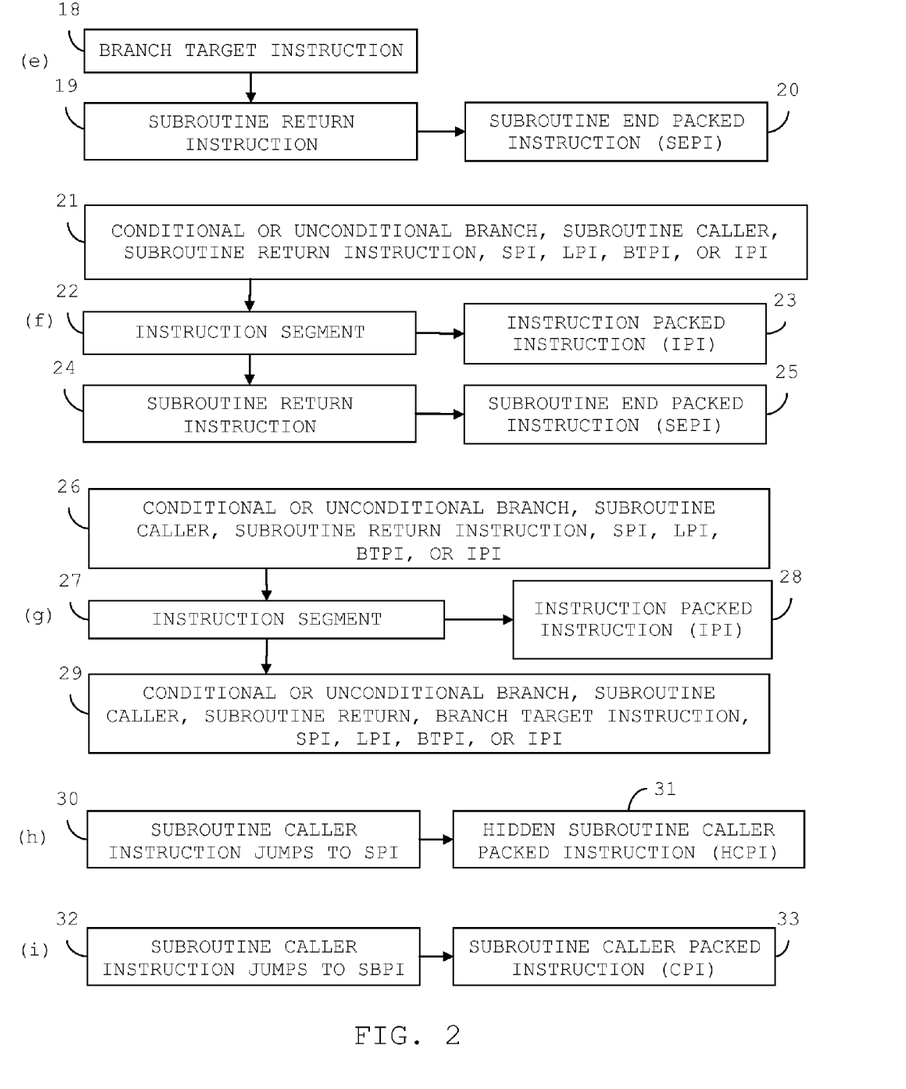

FIGS. 1 and 2 show one embodiment of the instruction packing and scaling for reducing the fraction of program, extension of prefetch and fetch length, and advance accurate instruction prefetch and fetch in a concurrent and pipelined manner.

In one embodiment shown in FIG. 1, all of the instructions 1 to 17 are packed in order to reduce branch operations in the program, such as a subroutine 1, 2, 3, a beginning part of a subroutine 5, 6, a loop 10, 11, 13, and a branch target 14 with a non-fraction instruction segment 15.

In one embodiment, an instruction packing and scaling method packs all of the instructions from a subroutine begin instruction 1 to a subroutine return instruction 3. A PANI created as a subroutine packed instruction (SPI) 4, is for packing an entire subroutine including the instruction segment 2 between the subroutine begin instruction 1 and the subroutine return instruction 3 without including any conditional or unconditional branch instructions, branch target instructions, subroutine callers, or any subroutine begin instructions. A SPI is not stored to a single or a plurality of the main PANI memory 81, but stored to a single or a plurality of the main NIPI memory 83 in order to directly prefetch and/or fetch from the native instructions of the SPI stored in the single or the plurality of the main NIPI memory 83.

In one embodiment, an instruction packing and scaling method packs all of the instructions from a subroutine begin instruction 5 to a last instruction in the instruction segment 6. A PANI created as a subroutine begin packed instruction (SBPI) 9, is for packing a beginning part of a subroutine including the instruction segment 6, which only includes a single or a plurality of instructions before the instruction that is a conditional or unconditional branch instruction, a branch target instruction, a subroutine caller, or any subroutine begin instruction. The associative subroutine return instruction 8 should be found after the instruction 7.

In one embodiment, an instruction packing and scaling method packs all of the instructions in the instruction segment 11 between the beginning instruction of a loop or a branch target instruction 10 and the last instruction in the loop, such as a branch instruction to the beginning instruction of the same loop 13. A PANI 12 created as a loop packed instruction (LPI) 12, is for packing an entire loop or a ending part of a loop including the instruction segment 11 between the beginning instruction of the loop or the branch target instruction 10 and the last instruction in the loop 13, which does not include any conditional or unconditional branch instructions, branch target instructions, subroutine callers, any subroutine begin or return instructions, or any PANI excluding any other LPI.

In one embodiment, an instruction packing and scaling method packs all of the instructions from the branch target instruction 14 to the instruction segment 15. A PANI 16 created as a branch target packed instruction (BTPI) 16, is for packing any instruction at the branch target location 14 and the following instruction segment 15, which only includes a single or a plurality of instructions before the instruction that is a conditional or unconditional branch instruction, branch target instruction, subroutine caller, any subroutine begin or return instruction, or any other PANI.

In one embodiment shown in FIG. 2, all of the instructions 18 to 33 are packed in order to reduce branch operations in the program, such as a branch target 18 or any instruction segment 22 excluding a conditional or unconditional branch instruction, branch target instruction, subroutine caller, any subroutine begin or return instruction, or any other PANI 21 with an ending part of subroutine 24, an instruction segment 27 between a conditional or unconditional branch instruction, branch target instruction, subroutine caller, any subroutine begin or return instruction, and any other PANI 26, 29, a subroutine caller jumping to a SPI 30, and a subroutine caller jumping to a SBPI 32.

In one embodiment, an instruction packing and scaling method packs all of the instructions from a branch target instruction 18 to a subroutine return instruction 19. A PANI 20 created as a subroutine end packed instruction (SEPI) 20, is for packing from an instruction at a branch target location 18 to a subroutine return instruction 19 including the instruction segment, which only includes a single or a plurality of instructions without causing any code fraction between the instructions 18 and 19.

In one embodiment, an instruction packing and scaling method packs all of the instructions from the instruction segment 22 between a conditional or unconditional branch instruction, a subroutine caller, a subroutine return instruction, or any other PANI including SPI, LPI, BTPI, or other instruction packed instruction (IPI) 23, 28 and the subroutine return instruction 24. A PANI 23 created as an IPI 23. Therefore, the subroutine return instruction 24 is packed as a subroutine end packed instruction (SEPI) 25. The SEPI 20 or the SEPI 25 releases the engaged prefetch counter 91 or fetch counter 92 in order to return to the next location of the subroutine caller packed instruction (CPI) 33.

In one embodiment, an instruction packing and scaling method packs all of the instructions from the instruction segment 27 between a conditional or unconditional branch instruction, a subroutine caller, a subroutine return instruction, or any other PANI including SPI, LPI, BTPI, or other IPI 23, 28 and a conditional or unconditional branch instruction, a subroutine caller, a subroutine return, a branch target instruction, or any other PANIs including SPI, LPI, BTPI, or other IPI 23, 28. A PANI 28 created as an IPI 28.

In one embodiment, an instruction packing and scaling method replaces a subroutine caller instruction 30, which jumps to any SPI where a complete subroutine is encapsulated, with a PANI as a hidden subroutine caller packed instruction (HCPI) 31. Any HCPI is used for prefetching and/or fetching the single or the plurality of the native instructions of the associated SPI, but never for fetching to the single or the plurality of the microprocessors 100. This enhances performance of the single or the plurality of the microprocessor systems by removing a pair of flow control instructions (i.e., a subroutine caller and a subroutine return) from the executable code.

In one embodiment, an instruction packing and scaling method replaces a subroutine caller instruction 32, which jumps to any SBPI where a beginning part of the subroutine is encapsulated, with a PANI as a subroutine caller packed instruction (CPI) 31. Any CPI is used for calling the associated SBPI in PANIs. Whenever a CPI is prefetched and/or fetched, the prefetch program counter 91 or the fetch program counter 92 currently being used holds a return address of the CPI. Another prefetch program counter 91 or fetch program counter 92 is used for continuous and indirect prefetching or fetching of a single or a plurality of the PANIs and the NIPIs of the associated PANIs in the target subroutine.

Similar to the HCPI 31, any CPI cannot be fetched to the single or the plurality of the microprocessors 100. This also enhances performance of the microprocessor system by removing a flow control instruction, such as a subroutine return, from the executable code and by preventing the CPI from being fetched to and executed by the single or the plurality of the microprocessors 100. Another CPI continues to create another new prefetch program counter 91 and/or fetch program counter 92 for multi-level subroutine calls by a plurality of CPIs. The HCPI and CPI can be fetched if the native subroutine caller and/or return instructions must perform more than the branch operations to a subroutine and/or from a subroutine.

In order to accomplish the direct prefetch and/or fetch of the NIPIs of the associated HCPI, the HCPI contains an address to access the main NIPI memory 83. In addition, a conditional or unconditional branch instruction in the LPI contains an address to access the main NIPI memory 83 for jumping to its target location of the loop packed in the LPI.

Any other conditional and unconditional branch instructions are not packed. Therefore, these non-packed native instructions are stored with other PANIs in the main PANI memory 80. Any CPIs and HCPIs must be also stored in the main PANI memory 80. In general, all of the packed non-native instructions in the main PANI memory 80 are not fetched to the single or the plurality of the microprocessors 100. Instead, the native instructions of the associated PANIs stored in the main NIPI memory 83 are fetched to the microprocessor. Similar to the HCPIs and CPIs, an unconditional branch instruction, which is not packed, cannot be fetched to the single or the plurality of the microprocessors 100 either. Therefore, conditional branch instructions, which are not packed to any packed instruction, are fetched to the single or the plurality of the microprocessors 100. Although other code fraction instructions, such as HCPIs, CPIs, and unconditional branch instructions, are still in the main PANI memory 80, these instructions are not fetched to nor executed on the single or the plurality of the microprocessors 100. This results in performance enhancement of the microprocessor system.

Any non-packed native unconditional instruction provides a branch location during the prefetch and/or fetch operation so that the prefetch and/or fetch operation can be continued. Consequently, the accurate prefetch and/or fetch length is extended.

In the invention, non-packed conditional branch instructions are used for determining prefetch and fetch distances, which are a number of the native instructions found between two closest conditional branch instructions on the program flow. As a result, the invention accurately prefetches and/or fetches a greater number of the native instructions to the single or the plurality of the microprocessors 100 than does one that is found in prior arts. In general, a microprocessor fetches instructions, but does not execute a significant amount of the instructions fetched. This also results in wasting energy.

The lower-level instruction cache, such as L1, is typically for fast instruction fetch. On the other hand, the upper-level instruction cache, such as L2, is for reducing instruction cache misses. In order to enhance accurate prefetch to the upper-level instruction cache, the instructions in the main PANI 80 and main NIPI 83 memories within an additional single or a plurality of the consecutive branch distances can be prefetched. In order to avoid prefetching the PANIs and NIPIs from both possible paths after the conditional branch instruction, branch prediction resources can be useful for achieving further accurate prefetch results.

In the invention, an instruction segment, such as the instruction segments 2, 6, 11, 15, 22, or 27 shown in FIGS. 1 and 2, can be separated to a single or a plurality of native instructions for packing, especially for a lengthy instruction segment. This instruction scaling contributes concurrent and pipelined prefetch and/or fetch via a plurality of banks of the main PANI 80 and the main NIPI 83 memories. This results in more native instructions in the same segment that can be prefetched and/or fetched than can those found in the prior arts.

Figure 3:
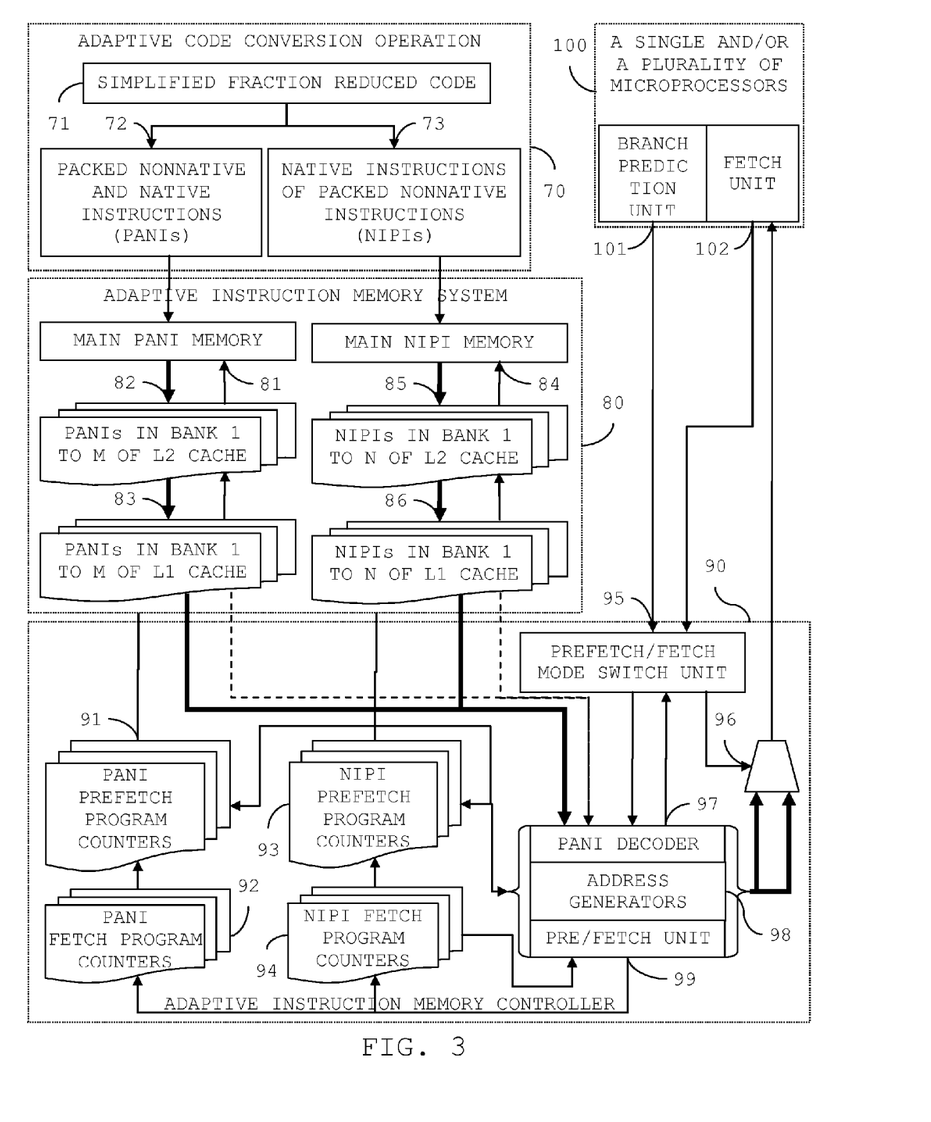
FIG. 3 is a diagram showing one embodiment of a static code conversion and a dynamic code reversion system including a microprocessor and the adaptive instruction prefetching and fetching system that consists of the adaptive instruction memory system, the adaptive instruction memory controller for performing a single or plurality of accurate concurrent instruction prefetching and fetching operations.

FIG. 3 is one embodiment of the detailed components and organization of the Adaptive Code Fraction Reduction components including a single or a hierarchical adaptive instruction memory system 80, an adaptive instruction memory controller 90, and a single or a plurality of microprocessors 100 found in the prior arts wherein a plurality of the hierarchical adaptive instruction memory systems 80 and a plurality of the adaptive instruction memory controllers 90 can be used for a single or a plurality of microprocessors 100 if necessary.

In one embodiment, the adaptive code conversion operation 70 contains the simplified fraction reduction code 71 consisting of PANIs 72 and NIPIs 73.

The PANIs 72 contain two types of instructions—packed non-native and non-packed native instructions. The packed non-native instructions include the packed instructions, such as LPI 12, SBPI 9, SEPI 20, 25, HCPI 31, CPI 33, BTPI 16, and IPI 23, 28. The non-packed native instructions include conditional branch and/or unconditional branch instructions. Only SPI 4 is not included in the PANIs 72 although the SPI 4 is created by packing the entire subroutine. The native instructions packed in the SPI 4 are included in the NIPIs 73.

The NIPIs 73 contain a single or a plurality of the native instructions of the packed non-native instructions in the PANIs 72. The native instructions in the NIPIs 73 are either directly or indirectly accessed by prefetching and/or fetching the associated packed instructions in the PANIs 72. The packed instructions that directly access the instructions in the NIPIs 73 are LPI 12, SBPI 9, SEPI 20, 25, HCPI 31, CPI 33, BTPI 16, and IPI 23, 28. The other packed instruction that indirectly accesses the instructions in the NIPIs 73 is CPI 33. The CPI 33 jumps to the SBPI 9 and then the instructions of the SBPI 9 in the NIPIs 73 are accessed. Since the CPI 33 is for calling a subroutine, which is not packed entirely like a SPI 4, the CPI 33 initiates a subroutine calling operation including engagement of other prefetch program counters 91 and/or fetch program counters 92 for PANIs 72 in the adaptive instruction memory controller 90. The SEPI 20, 25 operates subroutine termination by discharging the associative prefetch program counters 91 and/or fetch program counters 92 for PANI 72 after accessing all of the native instructions packed from the main NIPI memory 84.

In one embodiment, the adaptive instruction memory system 80 consists of a single or a plurality of the main PANI memories 81 and NIPI memories 84 and hierarchical cache memories, such as L1 caches 83, 86 for PANIs and NIPIs and L2 caches 82, 85 for PANIs and NIPIs. Each level of the cache memory consists of a single or a plurality of banks for PANI 82, 83 and for NIPI 85, 86. In particular, NIPIs can be separately stored to a plurality of banks for concurrent and pipelined prefetch and/or fetch. In order to perform the concurrent and pipelined prefetch and/or fetch, consecutive NIPIs on the program flow are allocated to different banks in the main NIPI memory 84. More specifically, NIPIs of the PANIs at the next PANI of the next conditional branch instruction and at the branch target of the same conditional branch instruction are allocated to different banks for accessing NIPIs from both branch-taken and branch-not-taken locations in a concurrent and pipelined manner.

A single or a plurality of PANIs 72 are fetched from a single or a plurality of banks of the L1 PANI cache 83 to the fetch unit 102 in the single or the plurality of the microprocessors 100 if the L1 PANI cache 83 is hit. Otherwise, the next level of cache, the L2 PANI cache 82 is accessed. The single or the plurality of PANIs 72 are fetched from the L2 PANI cache 82 to the fetch unit 102 in the single or the plurality of the microprocessors 100 and are stored to the L1 PANI cache 83 if the L2 PANI cache 82 is hit. Otherwise, the single or the plurality of PANIs 72 are fetched from a single or a plurality of the main PANI memories 81 to the fetch unit 102 in the single or the plurality of the microprocessors 100 and are stored to the L2 and L1 PANI caches 82, 83. Only a single or a plurality of non-packed native conditional branch instructions fetched from the PANIs 72 is delivered to the fetch unit 102 in the single or the plurality of the microprocessors 100. All other PANIs 72 are used for accessing the associated NIPIs from a single or a plurality of the main NIPI memories 84 via the NIPI caches 85, 86. Thus, purely native instructions are only fetched to the fetch unit 102 in the single or the plurality of the microprocessors 100.

A single or a plurality of NIPIs 73 are fetched from a single or a plurality of banks of the L1 NIPI cache 86, from a single or a plurality of banks of the L2 NIPI cache 85, or from a single or a plurality of the main NIPI memories 84 to the fetch unit 102 in the single or the plurality of the microprocessors 100 until the NIPIs that needed to be fetched are fetched. Any L1 NIPI cache memory 86 miss leads to accessing upper-level L2 NIPI cache 85 and/or the main NIPI memory 84.

A single or a plurality of PANIs 72 and the associated NIPIs 73 located between two non-packed native conditional branch instructions are fetched in order to achieve the accurate fetch operations. In particular, the PANIs 72 and the associated NIPIs 73 at the next PANI of the next second conditional branch instruction and at the branch target of the second conditional branch instruction are fetched. This is a cycle of the adaptive fetch operation. This adaptive fetch operation can be extended if necessary.

Both the L1/L2 PANI 82, 83 and L1/L2 NIPI 85, 86 cache memories are also used for the prefetch operations. The adaptive prefetch operations of the PANIs 72 and NIPIs 73 are similar to the adaptive fetch operations described above. The adaptive prefetch operation usually performs a greater number of adaptive fetch cycles. A branch prediction unit 101 found in the prior arts in the single or the plurality of the microprocessors 100 and/or a branch prediction unit in the adaptive instruction memory controller 90 can be employed in order to increase the accuracy of the adaptive prefetch operation. With the predicted branch information, the adaptive prefetch and/or fetch operation only accesses the PANIs and NIPIs at the predicted branch target location and continues to perform another cycle of the prefetch and/or fetch operation if necessary.

In one embodiment, the adaptive instruction memory controller 90 consists of nine components. The seven components are the single or the plurality of the PANI prefetch program counters 91, the single or the plurality of the PANI fetch program counters 92, the single or the plurality of the NIPI prefetch program counters 93, the single or the plurality of the NIPI fetch program counters 94, the adaptive PANI decoder 97, the single or the plurality of address generators 98, the prefetch unit 99, the adaptive prefetch/fetch mode switch unit 95, and the multiplexer 96 for switching and passing fetched PANI 72 or NIPI 73 to the fetch unit 102 in the single or the plurality of the microprocessors 100. In addition, a branch prediction unit can be located in the prefetch unit 99. A portion of the adaptive prefetch/fetch mode switch unit 95 and the multiplexer 96 are also implemented as a single or a plurality of entries of instruction queues. These components are interconnected to the other components, such as the branch prediction unit 101 and the instruction fetch unit 102, in the single or the plurality of the microprocessors 100, and also to components such as the single or the plurality of banks of the PANI 83 and the NIPI 86 cache memories.

The instruction fetch unit 102 transmits an instruction fetch request to the adaptive prefetch/fetch mode switch unit 95 in the adaptive instruction memory controller 90. The instruction fetch unit 102 receives a single or a plurality of native instructions from the adaptive instruction memory controller 90 after transmitting the request to the adaptive instruction memory controller 90. The instruction fetch unit 102 transmits a single or a plurality of address values stored to the adaptive prefetch/fetch mode switch unit 95 for fetching a single or a plurality of native instructions. The instruction fetch unit 102 updates a new address value for fetching the next single and/or the next plurality of native instructions by increasing the address value by the predefined offset value or the new address value passed from the instruction fetch unit 102 similarly to microprocessors found in the prior arts.

In one embodiment, the adaptive prefetch/fetch mode switch unit 95 has two modes, the PANI fetching mode and the NIPI fetching mode. The adaptive prefetch/fetch mode switch unit 95 is initialized as the PANI fetching mode. The adaptive prefetch/fetch mode switch unit 95 receives an instruction fetching address from the instruction fetch unit 102. The adaptive prefetch/fetch mode switch unit 95 forwards the address to the PANI decoder 97. The adaptive prefetch/fetch mode switch unit 95 also receives a mode switching signal from the PANI decoder 97. The adaptive prefetch/fetch mode switch unit 95 switches the current mode to another mode whenever the mode switching signal is received. The adaptive prefetch/fetch mode switch unit 95 transmits a control signal to the multiplexer 96 to pass the single or the plurality of PANIs fetched from the L1 PANI cache 83, the L2 PANI cache 82, or the main PANI memory 81 if the PANI fetching mode is set. Otherwise, the adaptive prefetch/fetch mode switch unit 95 transmits a control signal to the multiplexer 96 to pass the single or the plurality of NIPIs fetched from the L1 NIPI cache 86, the L2 NIPI cache 85, or the main NIPI memory 84 via the prefetch unit 99.

The multiplexer 96 transmits the single or the plurality of native instructions delivered from the L1 PANI cache 83 via the PANI decoder 97 or from the L1 NIPI cache 86 via the prefetch unit 99 according to the control signal received from the adaptive prefetch/fetch mode switch unit 95. In particular, a single or a plurality of non-packed native conditional branch instructions from any of the L1 PANI cache 83, the L2 PANI cache 82, or the main PANI memory 81 via the PANI decoder 97 is passed to the multiplexer 96 only after the PANI decoder 97 identifies the non-packed native conditional branch instructions unless any packable native instruction intentionally remains as non-packed native instruction in PANI.

In one embodiment, the PANI decoder 97 forwards the received instruction fetch address from the adaptive prefetch/fetch mode switch unit 95 to the single or the plurality of the PANI fetch program counters 92 via the address generators 98 if the PANI fetching mode is set. The single or the plurality of the PANI fetch program counters 92 can be used for fetching a single or a plurality of PANIs simultaneously in a pipelined manner. The single or the plurality of PANI fetch program counters 92 is used for fetching the PANIs 72 from the already prefetched PANIs 72 according to the programming order of the PANIs 72 passed from the single or the plurality of the microprocessors 100 by synchronizing with the new program counter value during the PANI fetching mode. The single or the plurality of the PANI fetch program counters 92 forwards the copies of the stored instruction fetching addresses to the prefetch unit 99. The single or the plurality of the PANI fetch program counters 92 updates the associated single or plurality of fetch program counter values for fetching the next single and/or the next plurality of the PANIs whenever receiving the instruction fetch request from the single or the plurality of the microprocessors 100.

In one embodiment, one of the available PANI or NIPI prefetch program counters 91, 93 in the adaptive instruction memory controller 90 stores the received instruction fetching address. The single or the plurality of the address generators 98 in the adaptive instruction memory controller 90 asserts a single or a plurality of instruction prefetching addresses to the L1 PANI cache 83 or the L1 NIPI cache 86. The L1 PANI cache 83 or the L1 NIPI cache 86 outputs a single or a plurality of PANIs or NIPIs and a cache hit or miss signal to the PANI decoder 97. Upon receiving the cache hit signal, the PANI decoder 97 evaluates and identifies each PANI 72 received and forwards only the single or the plurality of the native conditional branch instructions or other non-packed native instructions to the PANI input port of the multiplexer 96 or the single or the plurality of the NIPIs 73 to the NIPI input port of the multiplexer 96. Otherwise, the PANI decoder 97 postpones the PANI/NIPI identification operation until it receives the cache hit signal. The single or the plurality of the address generators 98 forwards a single or a plurality of instruction fetching addresses of the NIPIs 73 to the single or the plurality of the NIPI fetch program counters 94 according to the output of the PANI decoder 97. The single or the plurality of instruction fetching addresses of the NIPIs 73 is obtained from the PANIs 72 identified by extracting the starting address fields from the identified single or plurality of the PANIs 72 via the PANI decoder 97.

In one embodiment, the single or the plurality of the NIPI fetch program counters 94 stores the received single or plurality of instruction fetching addresses of the NIPIs 73 to a single or a plurality of available fetching program counters 94. The stored instruction fetching addresses of the NIPIs 73 are not changed until the NIPIs 73 are completely fetched. The single or the plurality of the NIPI fetch program counters 94 forwards the single or the plurality of newly stored fetch program counter values to the single or the plurality of the NIPI prefetch program counters 93. The single or the plurality of the NIPI prefetch program counters 93 holds the received single or plurality of the program counter values. The single or the plurality of the addresses stored in the single or the plurality of the NIPI prefetch program counters 93 is forwarded to a single or a plurality of the banks in the L1 NIPI cache 86.

In one embodiment, the single or the plurality of the NIPI prefetch program counters 93 sends the single or the plurality of the addresses to the single or the plurality of the banks in the L1 NIPI cache 86 and receives a single or a plurality of NIPIs 73 accessed and forwards the NIPIs 73 to the NIPI input port of the multiplexer 96 if the single or the plurality of the NIPIs is stored in the single or the plurality of the banks in the L1 NIPI cache 86. The single or the plurality of the banks in the L1 NIPI cache 86 also returns a cache hit signal to the prefetch unit 99 if any NIPI accessed is found in the single or the plurality of the banks in the L1 NIPI cache 86. Otherwise, the same single or the plurality of the received prefetch addresses continues to be forwarded to the single or the plurality of the L2 NIPI cache 85 for accessing the single or the plurality of NIPIs. This memory accessing operation continues whenever any cache miss occurs until the single or the plurality of NIPIs is accessed from the main NIPI memory 84.

In one embodiment, the prefetch unit 99 receives the associative information of the single or the plurality of prefetched NIPIs 73 and a cache hit signal. The prefetch unit 99 evaluates the prefetched associative information of the NIPIs and transmits a single or a plurality of prefetch termination signals to the single or the plurality of the NIPI prefetch program counters 93 if it receives the information of the last native instructions of the single or the plurality of the PANIs. Then, the single or the plurality of the NIPI prefetch program counters 93 invalidates the single or the plurality of the associated NIPI prefetch program counters 93. This indicates complete prefetch cycles of the single or the plurality of the PANIs and the associated NIPIs. Otherwise, the single or the plurality of the NIPI prefetch program counters 93 increments the associated single or the plurality of the prefetch program counter values for prefetching the next single or the plurality of the NIPIs consisting of native instructions and associative information of the PANIs 72. In addition, the prefetch unit 99 can stop fetching the PANIs 72 to the fetch unit 102 upon transmitting a conditional branch instruction in PANI 72 and resume the PANI fetching upon receiving the address of the next instruction of the conditional instruction from the fetch unit 102.

The prefetch unit 99 also terminates the single or the plurality of instruction fetching operations of the single or the plurality of the NIPIs addressed by the single or the plurality of the NIPI fetch program counters 94 when identifying the information of the last native instructions of the PANIs from the single or the plurality of the banks of the L1 NIPI cache 86. Then, the single or the plurality of the NIPI fetch program counters 94 invalidates the single or the plurality of associated fetch program counters 94. This indicates complete fetch cycles of the single or the plurality of the NIPIs of the single or the plurality of the PANIs. The PANI decoder 97 transmits a mode switching signal to the adaptive prefetch/fetch mode switch unit 95 for changing the current NIPI fetching mode to the PANI fetching mode as soon as the PANI decoder 97 receives the completion signal of the NIPI fetching operation from the prefetch unit 99. The PANI decoder 97 also transmits the cache hit signal received from the L1 PANI cache 83, the L2 PANI cache 82, the L1 NIPI cache 86, or the L2 NIPI cache 85 to the instruction fetch unit 102 whenever transmitting the fetched single or the plurality of the native instructions to the instruction fetch unit 102.

Prefetching of the single or the plurality of the NIPIs can be performed in a concurrent and/or pipelined manner. The single or the plurality of the NIPI prefetch program counters 93 asserts a single or a plurality of the prefetching addresses to the single or the plurality of the banks of the L1 NIPI cache 86 in every cache accessing clock cycle. These concurrent and/or pipelined prefetching operations can be terminated after prefetching the single or the plurality of the NIPIs located at the right after the non-packed conditional branch instruction and at the branch target of the same conditional branch instruction. Consequently, the branch miss prediction penalty can be mitigated while significantly enhancing the instruction cache hit rate with the small, simple, and fast instruction cache memory such as direct mapped cache that has faster access time, lower energy consumption, and smaller area than the same size of the set associative cache.

A conventional microprocessor typically contains an instruction fetch unit and a branch prediction unit. A single or a plurality of the microprocessors 100 includes the instruction fetch unit 102 and the branch prediction unit 101. The microprocessors 100 fetch and execute native instructions. The microprocessors 100 are interfaced through the adaptive instruction memory controller 90. The instruction fetch unit 102 sends out an address of the instruction to be fetched by asserting the content of the program counter. The address from the microprocessor is selectively forwarded to the single or plurality of active program counters for fetching the PANIs 72. The instruction fetch unit 102 receives only the native instructions, such as NIPIs 73 and non-packed native instructions in PANIs 72, from the adaptive instruction memory controller 90. The branch prediction unit 101 generates a branch target address and forwards the address to the fetch unit 102 so that any native instruction can be fetched before obtaining a branch target address by the microprocessors 100.

What is claimed is:

1. An apparatus for reducing code fraction comprising:
an instruction conversion and reversion method;
an adaptive instruction memory system; and
an adaptive instruction memory controller
wherein the apparatus for reducing code fraction is operable to:
convert a single or a plurality of native instructions from compiled code, such as assembly code, to mixed packed normative and non-packed native instructions (PANIs), and native instructions and associative information of the packed normative instructions (NIPIs) in compilation time via the instruction conversion method;
allocate PANIs and NIPIs of converted code to the dedicated, separate regions of distinct addresses in a single or a plurality of instruction memories;
eliminate and hide qualified branch instructions that appear in the program from the NIPIs;
revert the PANIs with the NIPIs stored in the dedicated, separate regions of distinct addresses in instruction caches and/or main memories to purely native instructions at runtime for compatible or identical execution via a single or a plurality of microprocessors;
revert the PANIs to only native instructions for equivalent operation to the operation of the original program at runtime by identifying the PANIs and by accessing native instructions of the NIPIs from a single or a plurality of the PANI and the NIPI main instruction and the cache memories;
prefetch both PANIs/NIPIs and/or fetch purely native instructions that will be executed by a single or a plurality of microprocessors by transmitting native instructions;
stop and resume the PANIs/NIPIs prefetch and fetch operations in order to prevent a single or a plurality of microprocessors from discarding the instructions already fetched;
perform dynamic inline expansions of subroutine caller instructions by neither employing subroutine call and return instructions nor duplicating the instructions of the subroutines during the PANIs/NIPIs prefetch and/or fetch operations;
perform dynamic loop reversion of the packed loops until the microprocessors complete the associated loop operations; and
protect original program from malicious and illegal copying, modification, usage of the program.

2. The apparatus for reducing code fraction of claim 1, wherein the instruction conversion and reversion method is operable to:
search and identify packable consecutive native instructions in a program for converting the identified native instructions to the PANIs and the NIPIs before prefetching and/or fetching the converted code;
pack all of the instructions from the subroutine begin instruction to the subroutine return instruction as a subroutine packed instruction (SPI), which does not include any conditional or unconditional branch instructions, branch target instructions, subroutine callers, or subroutine begin instructions, storing to a single or a plurality of the main NIPI memories;
pack all of the instructions from the subroutine begin instruction to the last instruction in the instruction segment as a subroutine begin packed instruction (SBPI), which only contains a single or a plurality of instructions before the instruction that is a conditional or unconditional branch instructions, branch target instructions, subroutine callers, or subroutine begin instructions, storing to a single or a plurality of the main PANI memories;
pack all of the instructions between the beginning instruction of a loop or a branch target instruction and the last instruction in the loop as a loop packed instruction (LPI), which does not include any conditional or unconditional branch instructions, branch target instructions, subroutine callers, any subroutine begin or return instructions, or any PANI excluding any other LPI, storing to a single or a plurality of the main PANI memories;
pack multi-level loops by packing the outer loop after packing the inner loop as a LPI;
pack all of the instructions from the branch target instruction to the instruction segment as a branch target packed instruction (BTPI), which only includes a single or a plurality of instructions before the instruction that is a conditional or unconditional branch instruction, branch target instruction, subroutine caller, any subroutine begin or return instruction, or any other PANIs of loops, subroutines, the beginning part of subroutines, and the branch target with a non-fraction instruction segment in order to reduce branch operation in the program;
pack all of the instructions from the branch target instruction to the subroutine return instruction as a subroutine end packed instruction (SEPI), which only includes a single or a plurality of non-code instructions and releases the engaged prefetch counter or fetch counter in order to return to the next location of the associated subroutine caller packed instruction (CPI);
pack all of the instructions between a conditional or unconditional branch instruction, a subroutine caller, a subroutine return instruction, or any other PANI including SPI, LPI, BTPI, or other IPI and a conditional or unconditional branch instruction, a subroutine caller, a subroutine return, a branch target instruction, or any other PANIs including SPI, LPI, BTPI, or other IPI as an instruction packed instruction (IPI);

replace a subroutine caller instruction, which jumps to any SPI where a complete subroutine is encapsulated, with a hidden subroutine caller packed instruction (HCPI) for prefetching and/or fetching a single or a plurality of the native instructions of the associated SPI, but never for fetching the HCPI to a single or a plurality of the microprocessors;

replace a subroutine caller instruction, which jumps to any SBPI where a beginning part of the subroutine is encapsulated as a subroutine caller packed instruction (CPI) for calling the associated SBPI in PANIs;

replace a subroutine caller instruction with the packed normative instruction of the body of the associated subroutine, which prevents a microprocessor from executing neither a subroutine call nor an associated subroutine return operation, while maintaining functional compatibility;

scale a plurality of instructions packed as a PANI into a plurality of PANIs to balance the instruction cache and/or memory usage by addressing the native instructions of the consecutively located packed normative instructions to the dedicated, separate regions in instruction caches and/or main memories, which have more unused or larger cache lines according to the associated cache replacement policy; and extend to packing threads, which encapsulate different threads in parallel programs, by changing boundaries of the instruction packing from the branch and branch target instructions to the instruction located at the beginning of a thread and at the end of the thread, and by allocating the packed threads to the dedicated, separate regions of distinct addresses in instruction cache and/or main memories for concurrently prefetching and/or fetching to multi-thread microprocessors.

3. The apparatus for reducing code fraction of claim 1, wherein the adaptive instruction memory system is operable to:

store PANIs and NIPIs separately to the dedicated, separate regions of distinct addresses in a single or a plurality of the main instruction memories;

revert the PANIs to purely native instructions of the NIPIs and non-packed instructions of the PANIs during the PANIs and NIPIs prefetch and/or fetch from the adaptive instruction memory system via the adaptive instruction controller;

prefetch and/or fetch a single or a plurality of PANIs and/or NIPIs in concurrent and/or pipelined manners from the dedicated, separate regions of distinct addresses in instruction cache and/or main memories;

stop prefetch and/or fetch of a single or a plurality of PANIs and/or NIPIs after prefetching and/or fetching a single or a plurality of conditional branch instructions including branch instructions, which can only determine their branch target locations after executing the instructions by the microprocessors;

resume prefetch and/or fetch of a single or a plurality of PANIs and/or NIPIs after receiving the address of the next instruction of the conditional branch instruction caused to stop the PANI and/or NIPI prefetch and/or fetch operations;

continue prefetch and/or fetch a single or a plurality of PANIs and/or NIPIs until prefetching and/or fetching a certain plurality of conditional branch instructions with or without branch prediction results;

terminate prefetching and/or fetching of the NIPIs by detecting the last native instruction of each NIPI;

terminate the prefetching operations of the PANI after prefetching a native conditional branch instruction via the PANI memory system by prefetching instructions from either the native branch target instruction or branch target instruction in a PANI and from either the next non-packed native instruction or the next packed normative instruction in the PANIs;

continue to prefetch and/or fetch the next instructions from the branch target locations if branch predicted conditional branch instructions, which provide their branch target addresses, are detected;

adjust the addresses for prefetching and/or fetching PANIs and/or NIPIs with the program address received from the microprocessors; and fetch subroutine caller and/or return instructions to the microprocessors to synchronize the addresses used for prefetching and/or fetching the PANIs with the addresses received from the microprocessor;

employ instruction cache memories that are a plurality of times faster for fetching both PANIs and NIPIs with reduced cache miss penalties; and employ a small and simple instruction caches for prefetching and/or fetching both PANIs and NIPIs to obtain access time that is at least twice as fast of the instruction caches and to conserve energy consumption of the PANI and NIPI cache memories.

4. The apparatus for reducing code fraction of claim 1, wherein the adaptive instruction memory system further comprises:

a single or a plurality of main PANI and NIPI instruction memories; and a single level or a hierarchical plurality of levels instruction cache memory organization comprising a single or a plurality of PANI and NIPI instruction cache memories.

5. The adaptive instruction memory system of claim 4, wherein the single level or the hierarchical plurality of levels of instruction cache memory organization comprising a single or a plurality of PANI and NIPI instruction cache memories are operable to prefetch and/or fetch the PANIs from the different locations of the same single or the separate plurality of the main instruction memories to a single or plurality of levels of PANI and NIPI instruction cache memories concurrently or sequentially if necessary.

6. The apparatus for reducing code fraction of claim 1, wherein the adaptive instruction memory controller comprising:

a single or a plurality of prefetch and fetch program counters for the PANIs and NIPIs;

a PANI decoder;

an address generator;

a prefetch unit;

a prefetch/fetch more switch unit; and a multiplexer;

wherein the adaptive instruction memory controller is operable to:

prefetch and fetch a single or a plurality of the PANIs and/or NIPIs in concurrent and/or pipelined manners from the single or the plurality of the main PANI and NIPI instruction memories via the single or the plurality of levels of the PANI and NIPI cache memories;

separately prefetch and fetch a single or a plurality of PANIs and/or NIPIs according to the order of the instructions in the program by switching the paths of the PANIs and NIPIs stored in different main and/or cache memories;

terminate a single or a plurality of prefetches of the PANIs and/or NIPIs by prefetching the next sequential PANI of the non-packed branch instruction and PANI at the branch target location of the non-packed branch instruction by identifying availability of the instruction fetch and prefetch program counters;

stop a single or a plurality of PANI prefetch operations upon continuously prefetching a single or a plurality of conditional branch instructions;

resume a single or a plurality of PANI prefetch operations upon receiving a single or a plurality of prefetch requests of the next consecutive PANI of the conditional branch instruction in the program execution order from the prefetch unit;

stop a single or a plurality of PANI fetch operations upon continuously fetching a single or a plurality of conditional branch instructions;

resume a single or a plurality of PANI fetch operations upon receiving a single or a plurality of fetch requests of the next consecutive PANI of the conditional branch instruction in the program execution order from the microprocessors.

7. The adaptive instruction memory controller of claim 6, wherein the single or the plurality of PANI and NIPI prefetch and fetch program counters are further operable to:

receive the instruction fetch address via the prefetch unit where receiving the instruction fetch address from the fetch unit in the microprocessor via the prefetch/fetch mode switch unit;

fetch a single or a plurality of PANIs from the already prefetched PANIs according to the programming order stored in the single or the plurality of the PANI prefetch counters;

synchronize a single or a plurality of PANI program counter values upon receiving the program counter value of the non-consecutive instruction;

forward the copies of the stored instruction fetching addresses in a single or a plurality of the PANI fetch counters to a single or a plurality of the PANI prefetch program counters;

update the associated single or plurality of the fetch program counter values for fetching the next single or plurality of the PANIs whenever receiving the instruction fetch request from the microprocessor;

receive the copies of the stored instruction fetching addresses from the single or plurality of the PANI fetch program counters whenever a new program counter value is stored to the PANI fetch program counters;

store the received PANI instruction fetching address to one of the available PANI prefetch program counters;

assert a single or plurality of PANI prefetching addresses to the single or plurality of L1 PANI instruction cache memories;

provide a single or plurality of counters for fetching and/or prefetching instructions from the PANI instruction cache and main memories;

receive the adjusted values from the address generators whenever the PANI fetching mode is switched to the NIPI fetching mode;

receive the adjusted values from the address generators whenever the NIPI fetching mode is switched to the PANI fetching mode;

point to the locations of the next PANI instructions for the PANI fetching and/or prefetching operations after adjusting its values upon switching to the NIPI fetching mode or prefetching mode;

continue to be adjusted until an address of a nonconsecutive instruction is received from the microprocessors;

be synchronized with the address of a nonconsecutive instruction received for the instruction fetching operation when an address of a nonconsecutive instruction is received;

be also synchronized with the address of a nonconsecutive instruction for the instruction prefetching operation when receiving the address of a nonconsecutive instruction during the instruction prefetching operation; and be not synchronized with the address of a nonconsecutive instruction when the instruction fetching mode is switched to the PANI fetching mode since the received address of a nonconsecutive instruction is in the address region of the NIPIs.

8. The adaptive instruction memory controller of claim 6, wherein the single or the plurality of the NIPI prefetch and fetch program counters is further operable to:

receive a single or a plurality of NIPI instruction fetching addresses from the prefetch unit via the PANI decoder;

store the received single or the received plurality of NIPI instruction fetching addresses obtained from the PANIs by extracting the starting address fields from the identified PANIs to a single or plurality of available fetching program counters;

hold addresses of the single or the plurality of NIPI instruction fetching operations in the single or the plurality of the PANI fetch program counters from the prefetch unit via the PANI decoder to terminate the single or the plurality of NIPI fetching operations when the prefetch unit identifies the information of the last native instructions of the NIPIs from the single or the plurality of L1 NIPI cache memories;

invalidate the single or the plurality of associated NIPI fetch program counters to complete NIPI fetch operations;

receive the single or the plurality of newly stored NIPI fetch program counter values from the single or the plurality of the NIPI fetch program counters whenever a new program counter value is stored to the NIPI fetch program counters;

hold the received NIPI program counter values to a single or a plurality of the NIPI prefetch program counters;

forward the values of the single or the plurality of the NIPI prefetch program counters to the single or the plurality of the L1 NIPI cache memories;

receive a single or a plurality of the NIPI prefetch termination signals from the prefetch unit that evaluates the prefetched associative information of the NIPI if the prefetch unit receives the information of the last native instructions of the NIPI;

invalidate the single or the plurality of associated NIPI prefetch program counters to complete NIPI prefetch operations;

increment the associated single or the associated plurality of the NIPI prefetch program counter values for prefetching the next single or the next plurality of the same NIPIs if the prefetch unit does not receive the information of the last native instructions of the NIPI; and assert a single or a plurality of the prefetching addresses in the single or plurality of the NIPI prefetch program counters to the single or plurality of the L1 NIPI cache memories in every cache accessing cycle.

9. The adaptive instruction memory controller of claim 6, wherein the prefetch unit is operable to:
receive the address of the PANI fetch from the prefetch/ fetch mode switch unit via the PANI decoder;
forward a mode switching signal to the prefetch/fetch mode switch unit;
pass the native instructions to the assigned multiplexer after identifying the non-packed native instructions;
transmit an instruction fetching mode switching signal to the prefetch/fetch mode switch unit that transmits a control signal to the multiplexer for delivering the single or the plurality of native instructions fetched from the single or the plurality of L1 PANI cache memories or from the single or the plurality of L1 NIPI cache memories to the instruction fetch unit in the microprocessors, if the native instruction fetching mode is set;
forward the received instruction fetch address from the prefetch/fetch mode switch unit to the single or plurality of the PANI prefetch and fetch program counters if the PANI fetching mode is set;
receive the single or the plurality of the PANI and a cache hit or miss signal from the single or plurality of the PANI prefetch and fetch program counters;
evaluate and identify each PANI received and forward only the non-packed native instruction, such as conditional branch instruction, to one of the ports of the multiplexer upon receiving the cache hit signal;
postpone the aforementioned identification operation until it receives the cache hit signal if it does not receive the cache hit signal;
forward a single or a plurality of the NIPI instruction fetching addresses to the single or the plurality of the NIPI fetch program counters;
obtain the single or the plurality of NIPI fetching addresses by extracting the starting address fields from the identified PANI;
receive the single or the plurality of native instructions accessed from the addresses received from the single or the plurality of the NIPI prefetch program counters;
receive a cache hit signal from the single or the plurality of L1 NIPI instruction cache memories if any native instruction accessed is found in the single or the plurality of L1 NIPI instruction cache memories;
permit forwarding the same single or the same plurality of the NIPI prefetch addresses received from the NIPI prefetch program counters to the single or the plurality of L2 NIPI cache memories for accessing the single or the plurality of the NIPIs if any native instruction accessed is not found in the single or the plurality of the L1 NIPI instruction cache memories;
receive the associative information of the single or the plurality of the NIPI prefetched native instructions and a cache hit signal;
evaluate the prefetched associative information of the NIPIs and transmit a single or a plurality of prefetch termination signals to the single or the plurality of the NIPI prefetch program counters if it receives the information of the last native instructions of the NIPI;
invalidate the single or the plurality of associated prefetch program counters to complete NIPI prefetch operations;
increment the associated single or the associated plurality of the NIPI prefetch program counter values for prefetching the next single or the next plurality of the NIPIs;
terminate the single or the plurality of NIPI fetching operations addressed by the single or the plurality of the NIPI fetch program counters in the single or the plurality of the NIPI fetch program counters when identifying the information of the last native instructions of the NIPI from the single or the plurality of L1 NIPI instruction cache memories;
invalidate the single or the plurality of the associated NIPI fetch program counters to complete the NIPI fetch operations;
transmit a mode switching signal to the prefetch/fetch mode switch unit for changing the current NIPI fetching mode to the PANI fetching mode; and
transmit the cache hit signal received from either the single or the plurality of L1 NIPI instruction cache memories or the single or the plurality of L1 PANI instruction cache memories to the instruction fetch unit whenever transmitting fetched a single or a plurality of native instructions to the instruction fetch unit.

10. The adaptive instruction memory controller of claim 6, wherein the address generators is operable to:
generate the addresses for prefetching and fetching the PANIs;
adjust the values of the PANI program counters for instruction fetch whenever the mode is switched to the NIPI fetching mode;
adjust the values of the PANI program counters for instruction prefetch; and
be duplicated for a single or a plurality of concurrent instruction prefetching and fetching operations.

11. The adaptive instruction memory controller of claim 6, wherein the PANI decoder is operable to:
receive PANIs from the sequential and/or concurrent accessible L1 PANI cache and main memories;
receive current instruction fetching mode and/or prefetching mode from the instruction fetching and prefetching mode switches;
send instruction fetching and/or prefetching mode switching signals to the instruction fetching and prefetching mode switches when the last native instruction in the NIPI is detected;
forward the NIPIs to the microprocessor via the multiplexor;
distinguish between mixed packed normative instructions and non-packed native instructions in the received PANIs;
forward the packed normative instructions to the address generators of the first native instruction of each NIPI;
find any non-packed native instructions, which are forwarded to the microprocessor via the branch target address generators and prefetching terminators and the multiplexor;
receive any cache miss signals from either the PANI and/or NIPI in sequential and/or concurrent accessible L1 PANI and/or NIPI cache and main memories;
forward the received cache miss signals to the prefetching unit;
extract the starting address of the NIPI from the received packed normative instructions and forward the generated starting address of the native instructions in the NIPI stored in the sequential and/or concurrent accessible L1 NIPI cache and main memories; and
generate reset signals for initializing the NIPI program counters.

* * * * *